United States Patent
Wang et al.

(10) Patent No.: US 10,178,727 B2
(45) Date of Patent: Jan. 8, 2019

(54) ANALOG AND DIGITAL DIMMING CONTROL FOR LED DRIVER

(71) Applicant: Diodes Incorporated, Plano, TX (US)

(72) Inventors: Adrian Wang, San Jose, CA (US); Chien-Jen Su, Tainan (TW); Welton Shih, Taipei (TW)

(73) Assignee: Diodes Incorporated, Plano, TX (US)

( * ) Notice: Subject to any disclaimer, the term of this patent is extended or adjusted under 35 U.S.C. 154(b) by 0 days.

(21) Appl. No.: 15/049,590

(22) Filed: Feb. 22, 2016

(65) Prior Publication Data
US 2016/0255693 A1 Sep. 1, 2016

Related U.S. Application Data

(60) Provisional application No. 62/126,440, filed on Feb. 27, 2015.

(51) Int. Cl.
H05B 33/08 (2006.01)

(52) U.S. Cl.
CPC ..... *H05B 33/0845* (2013.01); *H05B 33/0812* (2013.01); *H05B 33/0824* (2013.01)

(58) Field of Classification Search
CPC .......... H05B 33/0845; H05B 33/0812
See application file for complete search history.

(56) References Cited

U.S. PATENT DOCUMENTS

| | | | | |
|---|---|---|---|---|
| 5,576,738 A | * | 11/1996 | Anwyl | G06F 1/3218 345/212 |
| 7,956,554 B2 | * | 6/2011 | Shteynberg | H05B 33/0818 315/224 |
| 8,120,277 B2 | * | 2/2012 | McKinney | H05B 33/0818 315/294 |
| 8,154,222 B2 | * | 4/2012 | Korsunsky | H05B 33/0818 315/307 |
| 8,536,799 B1 | | 9/2013 | Grisamore et al. | |
| 9,370,057 B2 | * | 6/2016 | Saes | H05B 33/0818 |
| 9,426,852 B2 | * | 8/2016 | Zudrell-Koch | H05B 41/3924 |
| 2005/0194915 A1 | * | 9/2005 | Elsheimer | G06F 3/0312 315/291 |

(Continued)

FOREIGN PATENT DOCUMENTS

WO    2010138238    12/2010

OTHER PUBLICATIONS

GreenChip, NXP Semiconductor N.V. "SSL5511T PWM and analog dimmable LED driver" AN11587, Rev. 2, 43 pgs., May 12, 2015, salesaddress@nxp.com.

(Continued)

*Primary Examiner* — Dylan C White

(57) ABSTRACT

A control circuit includes an input terminal for receiving an input signal, which maybe either a digital input signal or an analog input signal, and the control circuit is configured to provide a digital control signal in response to the input signal. The control circuit may include a mode detection circuit for determining whether the input signal is a digital signal or an analog signal and providing a mode signal, a multiplexer circuit configured to select either a digital reference signal or an analog reference signal in response to the mode signal, and a comparator configured for comparing the input signal with the reference signal selected by the multiplexer to provide the PWM control signal.

19 Claims, 8 Drawing Sheets

(56) References Cited

U.S. PATENT DOCUMENTS

| | | | |
|---|---|---|---|
| 2006/0108933 A1 | 5/2006 | Chen | |
| 2010/0084991 A1* | 4/2010 | Liu | H05B 33/0848 |
| | | | 315/291 |
| 2011/0187283 A1* | 8/2011 | Wang | H05B 37/02 |
| | | | 315/291 |
| 2014/0055044 A1 | 2/2014 | Kraft | |
| 2016/0057823 A1* | 2/2016 | Pope | H05B 37/0281 |
| | | | 315/210 |
| 2016/0088700 A1* | 3/2016 | Shaffer | H05B 33/0848 |
| | | | 315/200 R |

OTHER PUBLICATIONS

Thomas J. Ribarich et al., "Analog and Digital Fluorescent Lighting Dimming Systems", Technical Paper, International Rectifier, 6 pgs, TP, Apr. 10, 2002, 233 Kansas Street, El Segundo, CA 90245, USA.
International Search Report and Written Opinion for International Application No. PCT/US16/19463, dated Jun. 10, 2016, 13 pages.

* cited by examiner

ANALOG AND DIGITAL DIMMING CONTROL FOR LED DRIVER

CROSS-REFERENCES TO RELATED APPLICATIONS

This application claims priority to U.S. Provisional Patent Application No. 62/126,440, filed on Feb. 27, 2015, the content of which is incorporated herein by reference in its entirety.

BACKGROUND OF THE INVENTION

Light-emitting diodes (LED) offer many advantages over conventional lighting apparatus, such as long lifetime, high efficiency, and non-toxic materials. With the development of electronic technology, light-emitting diodes are finding ever wider applications. For example, in consumer applications, LED light bulbs are showing promise as replacement for conventional white light incandescent or florescent light bulbs. Further, more and more electronic devices adopt LCD as display, and LEDs are becoming increasingly popular as a backlight source.

LEDs are generally regulated by controlling their current. Typically, LEDs are operated such that their average current is constant, and power electronics components are used to create circuits which convert AC voltage into regulated LED constant average current to achieve a desired brightness. Dimming the brightness of the LED lamp may offer additional energy savings, enhance flexibility, and improve light source efficiency and lifetime. Dimming of an LED string can be controlled by either an analog dimming signal or a digital dimming signal. In analog dimming, the LED current is varied according to the magnitude of the dimming signal, but the LED is always on. In digital PWM (pulse width modulation) dimming, the LED on/off times are varied, and the LED brightness is controlled by the duty cycle of the PWM dimming signal.

It is desirable for an LED driver to be able to operate with both analog and digital dimming control signals. One conventional approach is to use two separate pins for accepting an analog dimming signal and a digital dimming signal. In some cases, two different control paths are used. A conventional approach uses a single input DIM pin to accept either an analog or a digital dimming control signal. The control circuit determines whether the input signal is analog or digital. In analog input dimming control mode, the LED current is varied according to the magnitude analog dimming control signal. In the digital input dimming control mode, the LED current is determined by the duty cycle of the input signal. For both dimming control types, the output current regulation remains analog.

BRIEF SUMMARY OF THE INVENTION

The inventors have recognized the limitations in conventional LED controllers that require two separate dimming signal pins to accept either a digital dimming signal or an analog dimming signal. The extra pin count can increase cost, especially for multi-channel LED drivers. In smart lighting applications, the controller often needs to control multiple channels. In such applications, high pin count not only increases the complexity of the part, but also consumes more chip size and circuit board area, which is undesirable in a space-limited light bulb system.

In a conventional approach, a single DIM input pin is used to accept both analog and digital dimming control signals. However, the output LED current control remains analog. A drawback of this approach is that the controller chip tends to be big and consumes more power. Further, analog dimming regulation does not provide adequate dimming linearity, especially at low current levels, which is desirable for LED lighting systems.

This invention teaches circuits and systems for an LED control circuit that only requires a single input pin to respond to either an analog dimming signal or a digital dimming signal and to provide a digital control signal to regulate the current flow in an LED string to control its brightness. Contrary to the conventional approach, for both the analog or digital input dimming control signals, an internal PWM (pulse width modulation) digital control signal is provided that drives a linear regulator to control the on/off of current flow in an LED to vary its brightness.

For example, the control circuit may include a mode detection circuit for determining whether the input signal is a digital signal or an analog signal, a multiplexor circuit selects either a digital reference signal or an analog reference signal, and a comparator circuit compares the input signal with the selected reference signal to provide an internal digital PWM control signal. The LED driver may also include a constant current regulator for receiving the internal PWM control signal and regulating on/off of the current in the LED.

The analog reference signal may be a sawtooth signal, and the digital reference signal may be a constant voltage. The constant current regulator may include an amplifier circuit to couple the output current to a reference constant current. The amplifier circuit has an enable node for receiving the PWM control signal to enable or disable the amplifier in response to the PWM control signal.

The single pin design with internal digital dimming improves dimming linearity, especially at low current levels, and reduces the cost of the control circuit and the overall LED driver system.

Definitions

The terms used in this disclosure generally have their ordinary meanings in the art within the context of the invention. Certain terms are discussed below to provide additional guidance to the practitioners regarding the description of the invention. It will be appreciated that the same thing can be said in more than one way. Consequently, alternative language and synonyms may be used.

A linear regulator is an electronic circuit used to maintain a steady voltage. Linear regulators may place the regulating device in parallel with the load (shunt regulator) or may place the regulating device between the source and the regulated load (a series regulator). The regulating device acts like a variable resistor, continuously adjusting a voltage divider network to maintain a constant output voltage. By contrast, a switching regulator uses an active device that switches on and off to maintain an average value of desired output.

A constant-current regulator is a linear regulator that provides a constant output current.

A light-emitting diode (LED) is a two-lead semiconductor light source. It is a p-n junction diode, which emits light when activated. When a suitable voltage is applied to the leads, electrons are able to recombine with electron holes within the device, releasing energy in the form of photons.

An analog signal is a continuous signal having a time varying feature. It differs from a digital signal, which includes a sequence of discrete values which can only take on one of a finite number of values.

Pulse-width modulation (PWM) is a modulation technique used to encode a message into a pulsing signal by varying the on/off times. In a power regulator, the average value of voltage (and current) fed to the load is controlled by turning the switch between supply and load on and off at a fast rate. The longer the switch is on compared to the off periods, the higher the total power supplied to the load. The term duty cycle describes the proportion of "on" time to the regular interval or "period" of time; a low duty cycle corresponds to low power, because the power is off for most of the time. Duty cycle is expressed in percent, 100% being fully on.

A multiplexer (mux) circuit is an electronics device that selects one of several input signals and forwards the selected input to an output. For example, a multiplexer of 2n inputs has n select lines, which are used to select which input line to send to the output.

A state machine is a mathematical model of computation used to design both computer programs and sequential logic circuits. Conceptually, it is an abstract machine that can be in one of a finite number of states. The machine is in only one state at a time; the state it is in at any given time is called the current state. It can change from one state to another when initiated by a triggering event or condition; this is called a transition. A particular state machine is defined by a list of its states, and the triggering condition for each transition.

A comparator circuit is an electronic device that compares two voltages or currents and outputs a digital signal indicating which is larger.

DETAILED DESCRIPTION OF THE INVENTION

Figure 1:
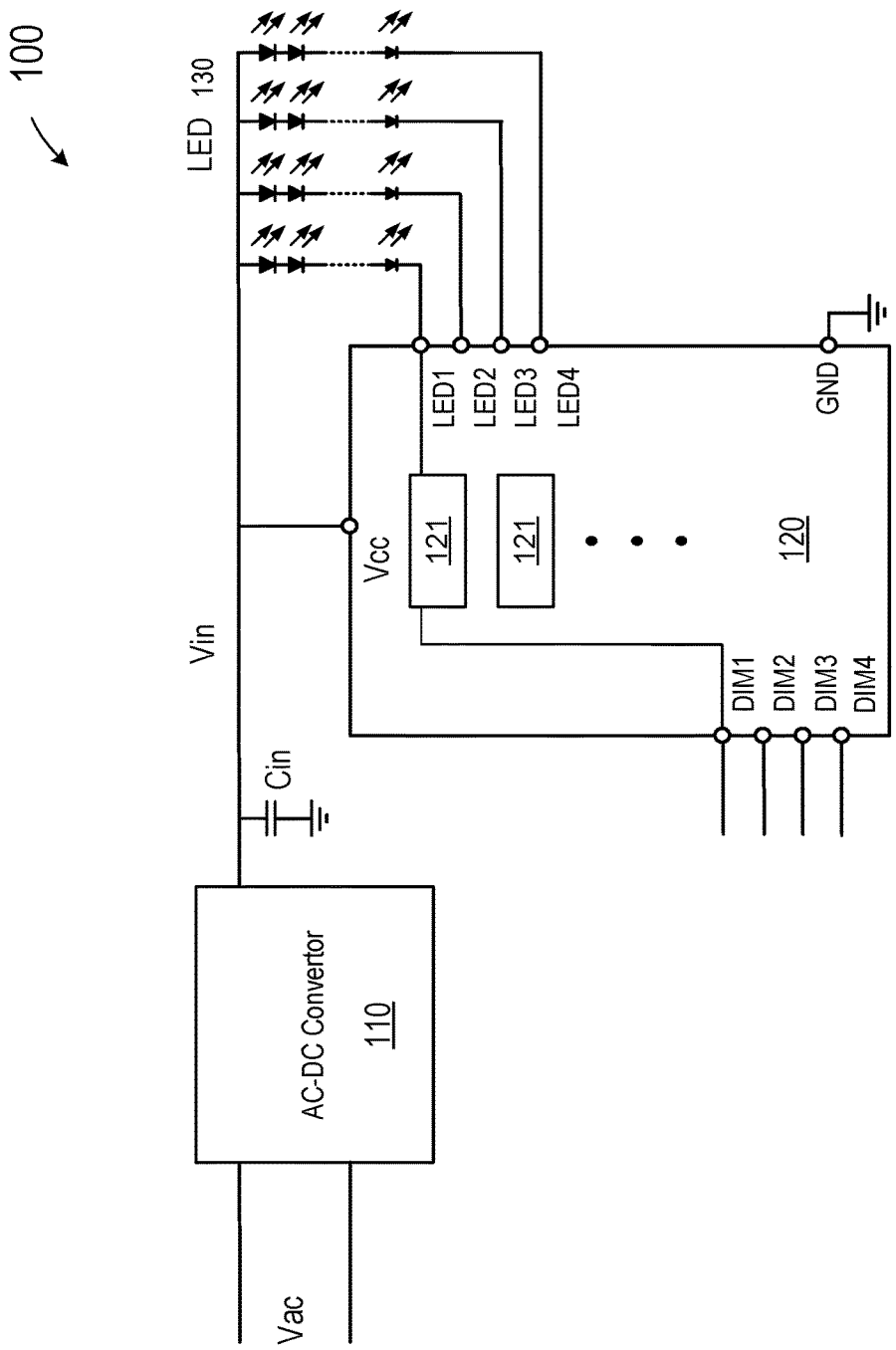
FIG. 1 is a simplified schematic diagram depicting a power supply for driving an LED (light-emitting-diode) lamp that embodies certain aspects of this invention.

FIG. 1 is a simplified schematic diagram depicting a power supply for driving an LED (light-emitting-diode) lamp that embodies certain aspects of this invention. As shown in FIG. 1, power supply 100 includes an AC-DC converter 110 coupled to an AC input source Vac for providing a DC voltage source Vin. Power supply 100 also includes a linear regulator 120 with a power terminal Vcc coupled to the DC voltage source for receiving a DC power supply Vin. As shown in FIG. 1, DC power supply Vin is also configured to provide power for an LED lamp 130, which has multiple LED strings. In FIG. 1, Vin is connected to the anodes of the LED strings. However, Vin can also be connected to the cathodes of the LED strings. Linear regulator 120 also includes one or more channels 121 configured to regulate a current flow in the LED string. Linear regulator 120 also has output terminals LED1, . . . , LED4, etc., coupled to LED strings of the LED lamp and input terminals, DIM1, . . . , DIM4, etc., for receiving a dimming input signal for each channel.

Figure 2:
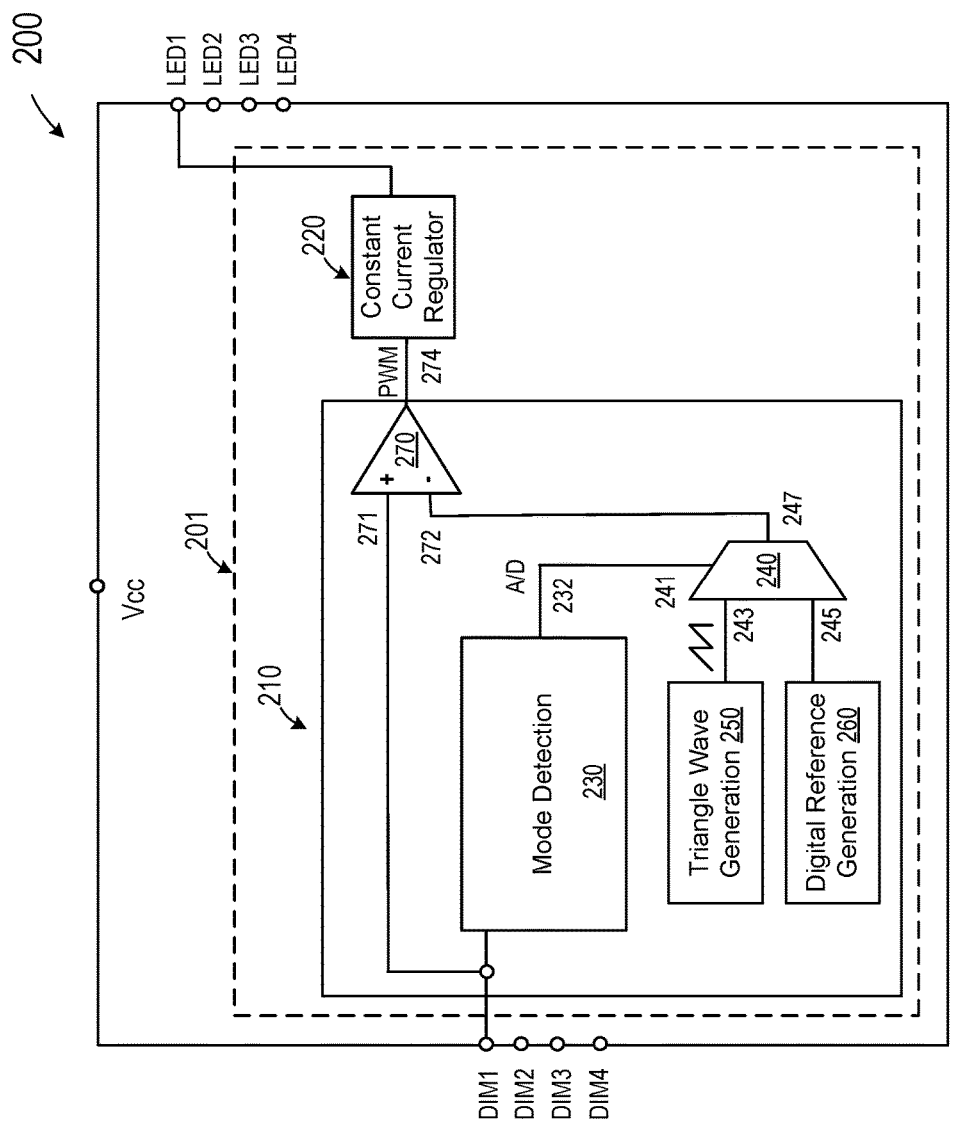
FIG. 2 is a simplified schematic diagram depicting a linear regulator that embodies certain aspects of this invention.

FIG. 2 is a simplified schematic diagram depicting a linear regulator that embodies certain aspects of this invention. Linear regulator 200 is an example of a linear regulator that can be used in power supply 100. As shown in FIG. 2, linear regulator 200 has a power terminal Vcc for receiving a DC power supply, which can also be configured to provide power for the LED lamp. As described above in FIG. 1, linear regulator 200 can have one or more channels for regulating the current flow in one or more LED strings. Only one channel 201 is shown in FIG. 2 for illustration purposes. Each channel includes an input terminal, e.g., DIM1, for receiving an input signal. The input signal can be either a digital input signal or an analog input signal. In some cases, the input signal can be a dimming control signal. Linear regulator 200 also has an output terminal, e.g., LED1, for each channel for coupling to an LED string of the LED lamp. Each channel is configured to regulate a current flow in the LED string based on the input signal. Each channel can include a control circuit 210 and a constant current regulator 220. Controller 210 circuit is coupled to the input terminal for receiving the input signal and providing a PWM digital control signal. Constant current regulator 220 is configured for receiving the PWM control signal and providing an output signal at the output terminal, e.g., LED1, for regulating the LED string of the LED lamp in response to the PWM signal.

As shown in FIG. 2, linear regulator 200 includes a control circuit 210 and a constant current regulator 220 for each channel. Control circuit 210 includes an input terminal for receiving an input signal, e.g., from terminal DIM1. The input signal can be either a digital input signal or an analog input signal, and control circuit 210 is configured to provide a digital control signal in response to the input signal. FIG. 2 illustrates a dimming control implementation, in which the input signal from DIM1 is a dimming control signal, and control circuit 210 is configured to provide a digital control signal PWM to control the dimming of the LED string connected to terminal LED1. However, the input signal is not limited to a dimming signal, and the output signal is not limited to a PWM signal.

As shown in FIG. 2, control circuit 210 includes a mode detection circuit 230 configured to determine whether the input signal is a digital signal or an analog signal and to output a mode signal 232, also marked as A/D to denote analog or digital, in FIG. 2. Control circuit 210 also has a multiplexer circuit 240, which includes a selection terminal 241 coupled to the output of the mode detection circuit, a first input terminal 243 for receiving an analog reference signal from a triangle wave generation circuit 250, a second input terminal 245 for receiving a digital reference signal from a digital reference signal generation circuit 260, and an output terminal 247 configured to provide a selected reference signal that is either the digital reference signal or the analog reference signal in response to the mode signal. Control circuit 210 also has a comparator circuit 270 that includes a first input terminal 271 coupled to the input signal DIM1, a second input terminal 272 coupled to the selected reference signal 247, and an output terminal 274 provides the digital control signal PWM.

In FIG. 2, dimming mode detection block 230 detects whether the input signal is an analog signal or a digital signal, and provides a dimming mode indicator signal, or mode signal, 232 to indicate whether the input signal is in an analog dimming mode or a digital PWM dimming mode. Multiplexer 240 receives the mode signal and to select the analog reference signal or the digital reference signal accordingly. In cases where the input signal is a digital PWM dimming signal, the digital reference signal may be a constant voltage with an appropriate voltage value to distinguish between the high level and the low level of the digital PWM dimming signal. For example, the digital reference signal maybe set at, 1.5 V. In cases where the input signal is an analog dimming signal, its magnitude represents the desired dimmed light brightness. In these cases, the analog reference signal may be a triangle or ramped waveform, which is compared to the input analog signal to produce a digital PWM signal, whose duty cycle represents the desired LED light brightness. Selected reference signal 247 is connected to input terminal 272 of comparator 270 and is compared to input signal DMI1 at input terminal 271 at comparator 270. Comparator 270 provides a digital PWM signal 274 at its output. Constant current regulator 220 controls the brightness of the LED string based on the digital PWM signal 274. The operations of the circuit blocks are described in more detail below.

Figure 3:
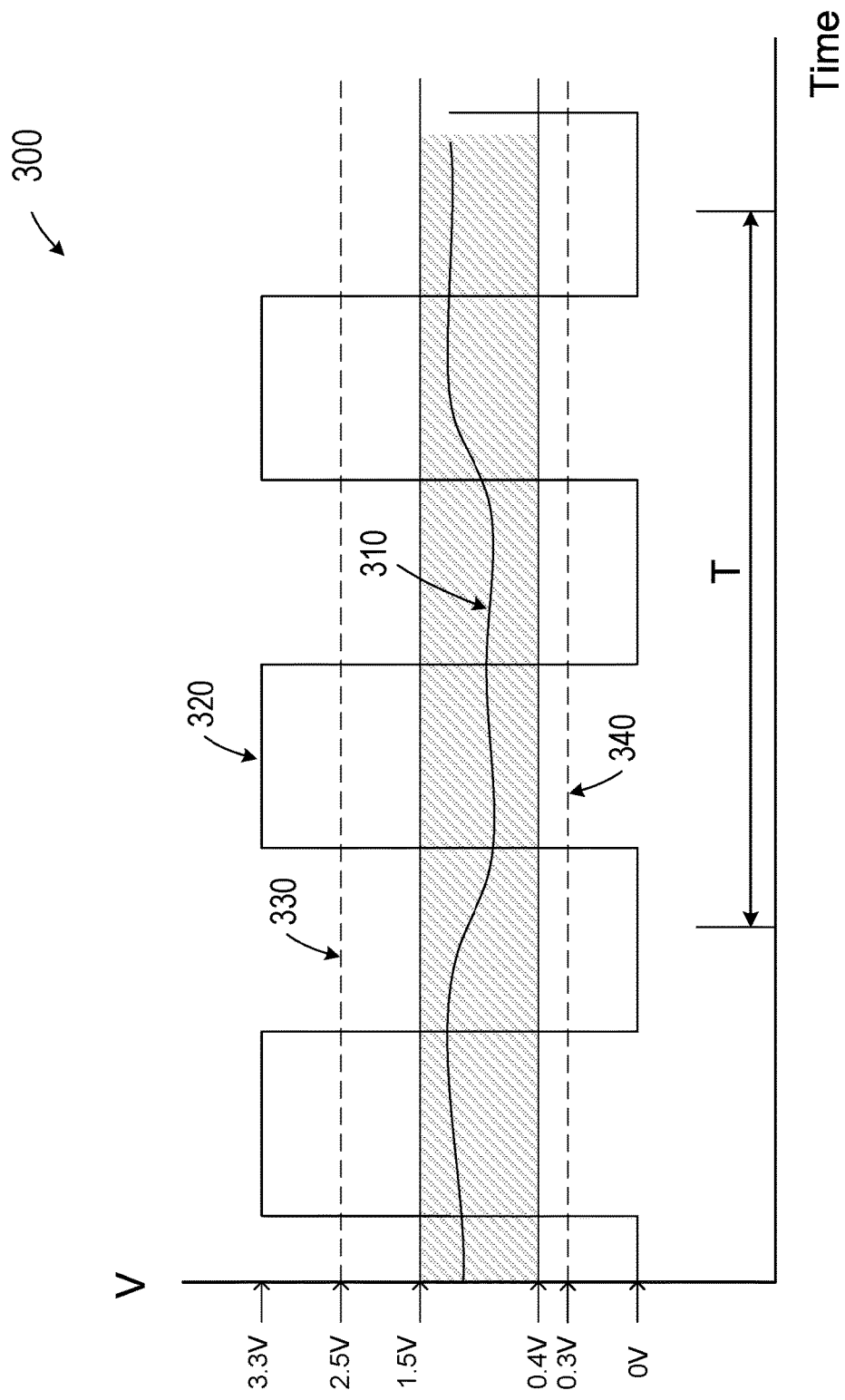
FIG. 3 is a simplified waveform diagram depicting a method for distinguishing an analog signal from a digital signal that illustrates certain aspects of this invention.

The operation of the mode detection circuit 230 is now described with reference to FIGS. 3-5. The controller determines the dimming control mode at start-up or whenever the requirement to determine the dimming mode is met. FIG. 3 is a simplified waveform diagram depicting a method for distinguishing an analog signal from a digital signal that illustrates certain aspects of this invention. As shown in FIG. 3, an analog dimming signal 310 usually ramps up or down slowly within a certain voltage range or a band, for example, from 0.4 V to 1.5 V. In contrast, a digital signal, such as PWM dimming signal 320 in FIG. 3, usually toggles up or down rapidly between power supply rails, for example, between 0 V and 3.3 V. The determination of either an analog or digital signal may be carried out in a given period of time, e.g., 10 msec. During this period of time, if the dimming signal toggles outside the expected analog voltage range at least a few times, the dimming signal is determined as a digital PWM dimming control signal. In FIG. 3, the voltage range is set between a PWM logic high threshold 330 (2.5 V) and a logic low threshold 340 (0.3 V). If the signal crosses the low and high thresholds at least a few times (e.g., twice) over a preset period of time, it is determined as digital PWM dimming control signal. This determination is reflected in the mode signal 232 in FIG. 2. The mode determination may be carried out at startup, after the power supply reaches its minimum operating range.

Figure 4:
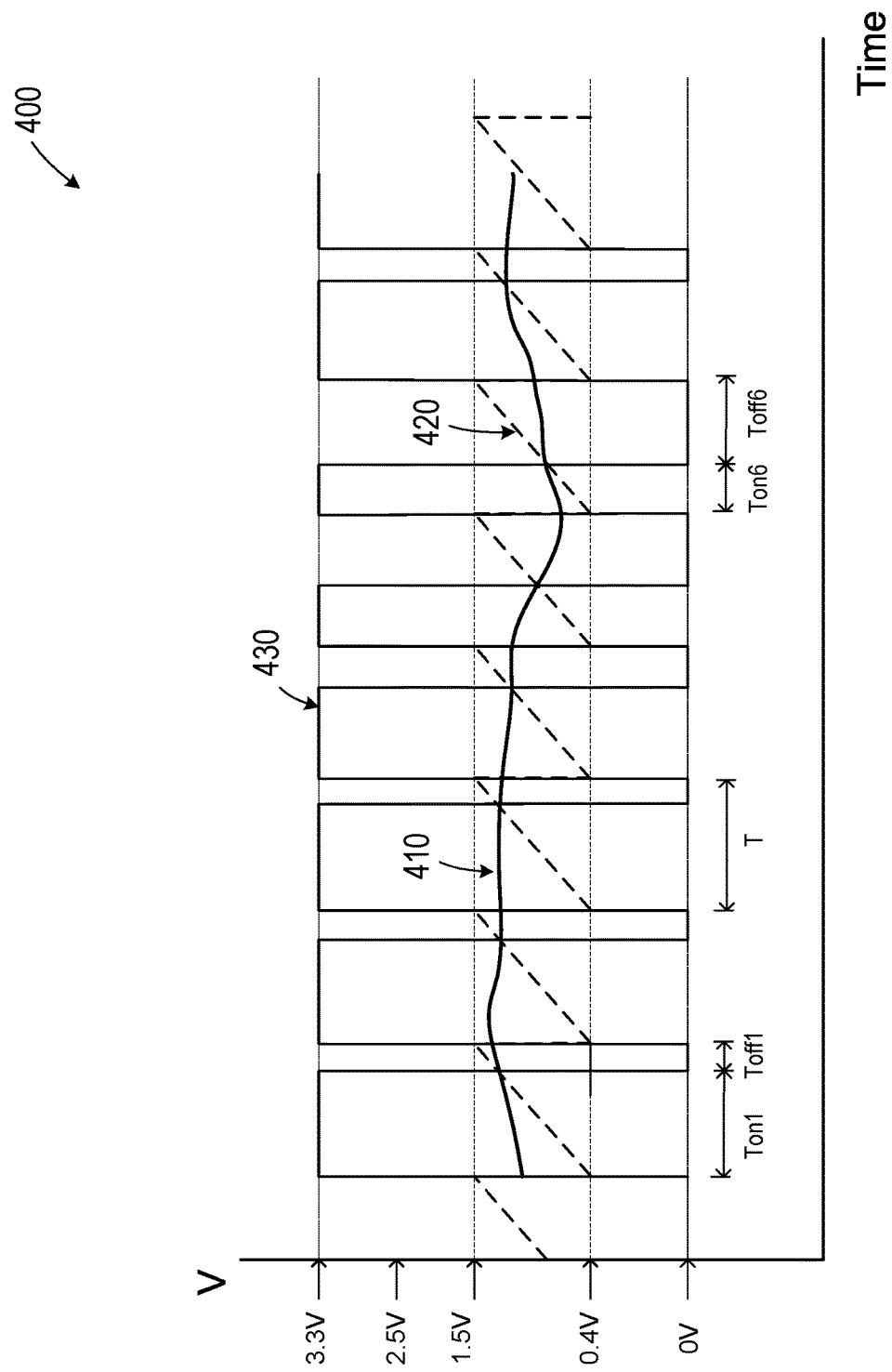
FIG. 4 is a simplified waveform diagram depicting a method for converting an analog signal to a PWM digital signal that illustrates certain aspects of this invention.

FIG. 4 is a simplified waveform diagram depicting a method for converting an analog signal to a PWM digital signal that illustrates certain aspects of this invention. This invention teaches that an analog signal maybe converted to a digital PWM signal by comparing it to a reference triangle or ramp waveform. As shown in FIG. 4, analog signal 410 is compared to a triangle or ramp waveform 420 in broken line. A digital signal 430 is formed such that when analog signal 410 is above the triangle waveform, digital signal 430 is at a high level. Conversely, when analog signal 410 is below the triangle waveform, digital signal 430 is at a low level. In this example, the triangle wave has a peak level set at 1.5 V and a valley level set at 0.4 V to cover the magnitude range of the analog signal. As shown in FIG. 4, digital PWM signal 430 has the same period T as triangle waveform 420, where there is the sum of on time Ton and off time Toff in a period T=Ton+Toff. For example, in FIG. 4, Ton1 and Toff1 are in the first period, and Ton6 and Toff6 are in the sixth period. The duty cycle of digital PWM signal 430 is the ratio of on time Ton to the period T. Therefore, the duty cycle of the digital PWM signal represents the magnitude of the analog signal in the period. Here, the period or frequency of the triangle waveform is selected to provide sufficient sampling of the variation of the analog input signal. For example, the frequency of the triangle wave maybe 2 KHz to 5 KHz.

Figure 5:
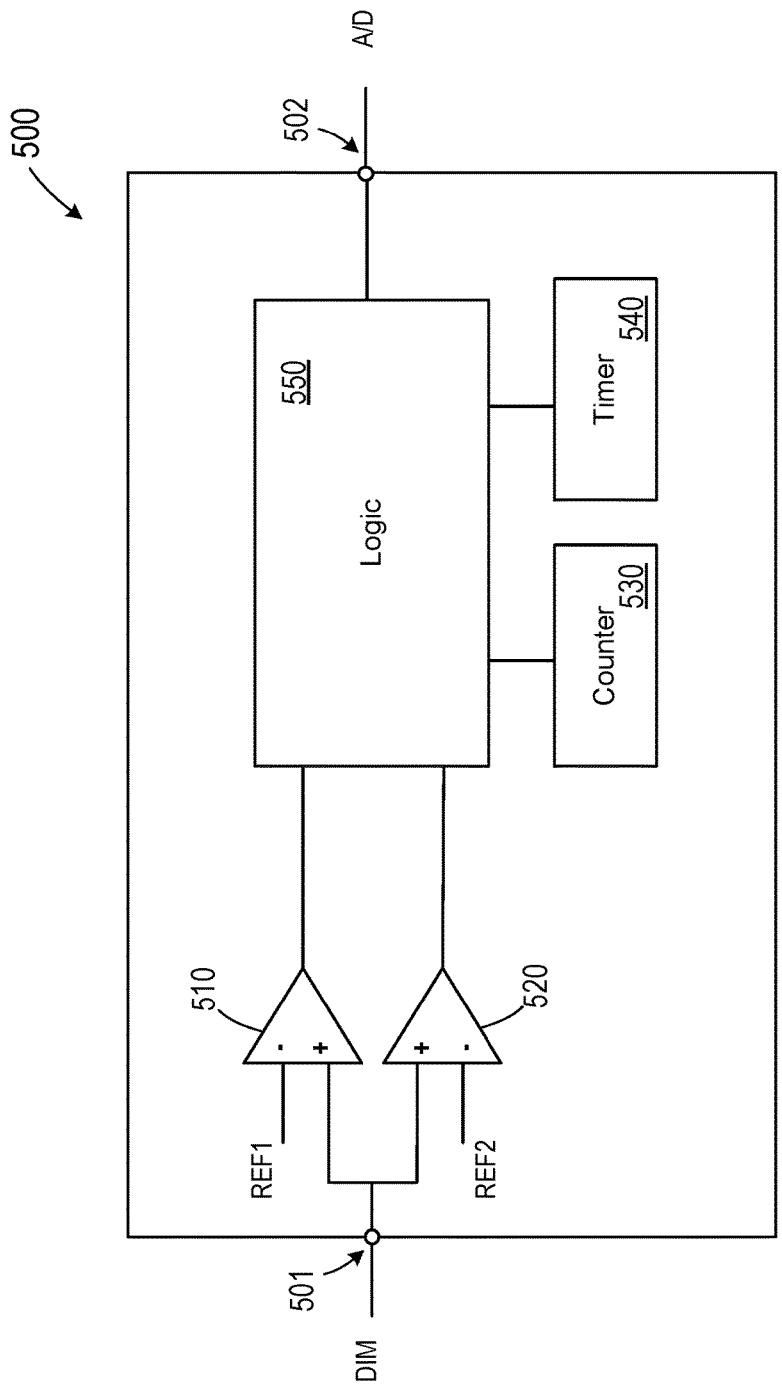
FIG. 5 is a simplified schematic diagram depicting an analog/digital mode detection circuit that embodies certain aspects of this invention.

FIG. 5 is a simplified schematic diagram depicting an analog/digital mode detection circuit that embodies certain aspects of this invention. Mode detection circuit 500 is an example of mode detection circuit that maybe used as mode detection circuit 230 in regulator 200 shown in FIG. 2, for determining whether the input signal is a digital signal or an analog signal. As shown in FIG. 5, mode detection circuit 500 includes an input terminal 501 for receiving an input signal, e.g., DIM, which maybe either an analog signal or a digital signal. Mode detection circuit 500 also has an output terminal 502 for providing an output signal, A/D, that indicates whether the input signal is analog or digital. Mode detection circuit 500 also has two comparators 510 and 520, having reference voltages REF1 and REF2, respectively. REF1 may be set to the lower bound of the analog signal, e.g., 0.4 V, and REF2 may be set at the higher bound of the analog signal, e.g., 1.5 V. Further, mode detection circuit 500 has a counter circuit 530, a timer circuit 540, and a logic circuit block 550, which is coupled to the aforementioned circuits and provides the output signal at terminal 502.

Mode detection circuit 500 determines whether the input signal is a digital signal or an analog signal according to the method illustrated above in connection with FIG. 3. In this example, mode detection circuit 500 is configured to determine the number of times the input signal crosses a reference signal within a preset period of time, and, if the number of times exceeds two, for example, mode detection circuit 500 determines that the input signal is a digital signal. If, within in the preset period of time, the input signal rises from below a first reference voltage to above a second reference voltage, drops from above the second reference voltage to below the first reference voltage, rises again from below the first reference voltage to above the second reference voltage, and drops from above the second reference voltage to below the first reference voltage, the input signal is determined to be a digital signal. The first and second reference signals span a reference voltage band, and mode detection circuit 500 counts the number of times the analog input signal crosses through the reference voltage band.

Mode detection circuit 500 is merely an example of a possible implementation. Different circuits maybe used to implement the mode detection circuit. For example, the mode detection circuit may be implemented using a state machine design or using logic circuit elements. As an example, if one of the channels is determined to have received a digital PWM dimming signal, then all channels are assumed to be operating in digital PWM dimming mode. Alternatively, each channel may determine whether its respective input signal is analog or digital.

Figure 6:
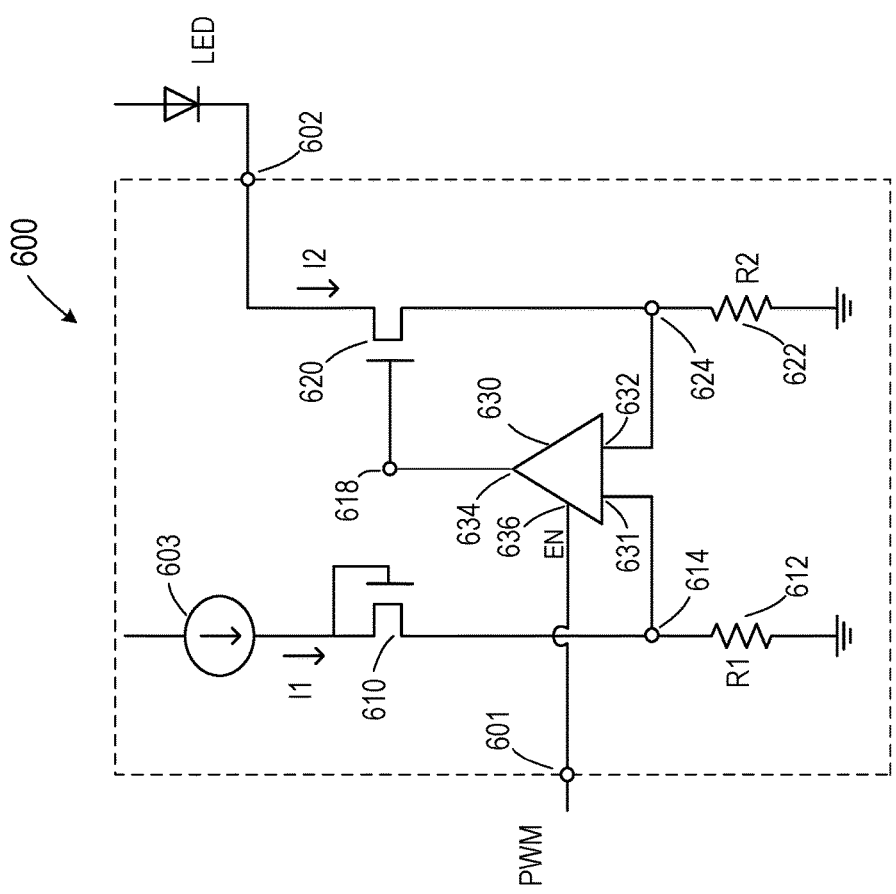
FIG. 6 is a simplified schematic diagram depicting a constant current regulator that embodies certain aspects of this invention.

FIG. 6 is a simplified schematic diagram depicting a constant current regulator that embodies certain aspects of this invention. Constant current regulator 600 is an example of regulators that maybe used as constant current regulator 220 in FIG. 2. As shown in FIG. 6, constant current regulator 600 has an input terminal 601 for receiving a digital PWM signal and an output terminal 602 for coupling to an LED string to control a current flow in the LED string. Constant current regulator 600 includes a constant current source 603 providing a current I1 and coupled in series with a first resistor 612 (R1) at a first node 614. An optional first NMOS transistor 610, with its gate connected to its source to function as a diode, may be coupled between the current source 603 and the first node 614. The output terminal 602 of constant current regulator 600 is coupled in series with a second NMOS transistor 620 and a second resistor 622 (R2). The second NMOS transistor 620 and the second resistor 622 are connected at a second node 624. Constant current regulator 600 also has an operational amplifier 630 that includes a first input 631 coupled to the first node 614 between the first NMOS transistor and the first resistor, and a second input 632 coupled to the second node 624 between the second NMOS transistor and the second resistor. Operational amplifier 630 also has an output 634 coupled to a node 618 that connects the gates of the first transistor and the second transistor. Operational amplifier 630 also has an enable node 636 (EN) coupled to the PWM control signal.

Operational amplifier 630 is part of a feedback loop that relates output current I2 to input current I1 under the control of the PWM signal at the enable node 636 (EN). If the operational amplifier is enabled by the PWM signal at a high state, the voltage at the first node 614 is equal to the voltage at the second node 624, and a current I2 flowing in the second NMOS transistor 620 is proportional to the current I1 of the constant current source 603 by factor n–a ratio of the resistance of the first resistor R1 to the resistance of the second resistor R2. In other words, R1=n*R2 and I2=n*I1. When the PWM signal is low, operational amplifier 630 is turned off and the second NMOS transistor 620 is also turned off, causing current I2 to be zero. In this manner, the current provided at the output terminal to the LED string, I2, is controlled by the PWM control signal. The average current of I2 is proportional to the duty cycle of the PWM signal. Therefore, when the PWM signal is a dimming control signal, the brightness of the LED string is proportional to the duty cycle of the PWM dimming signal.

Figure 7:
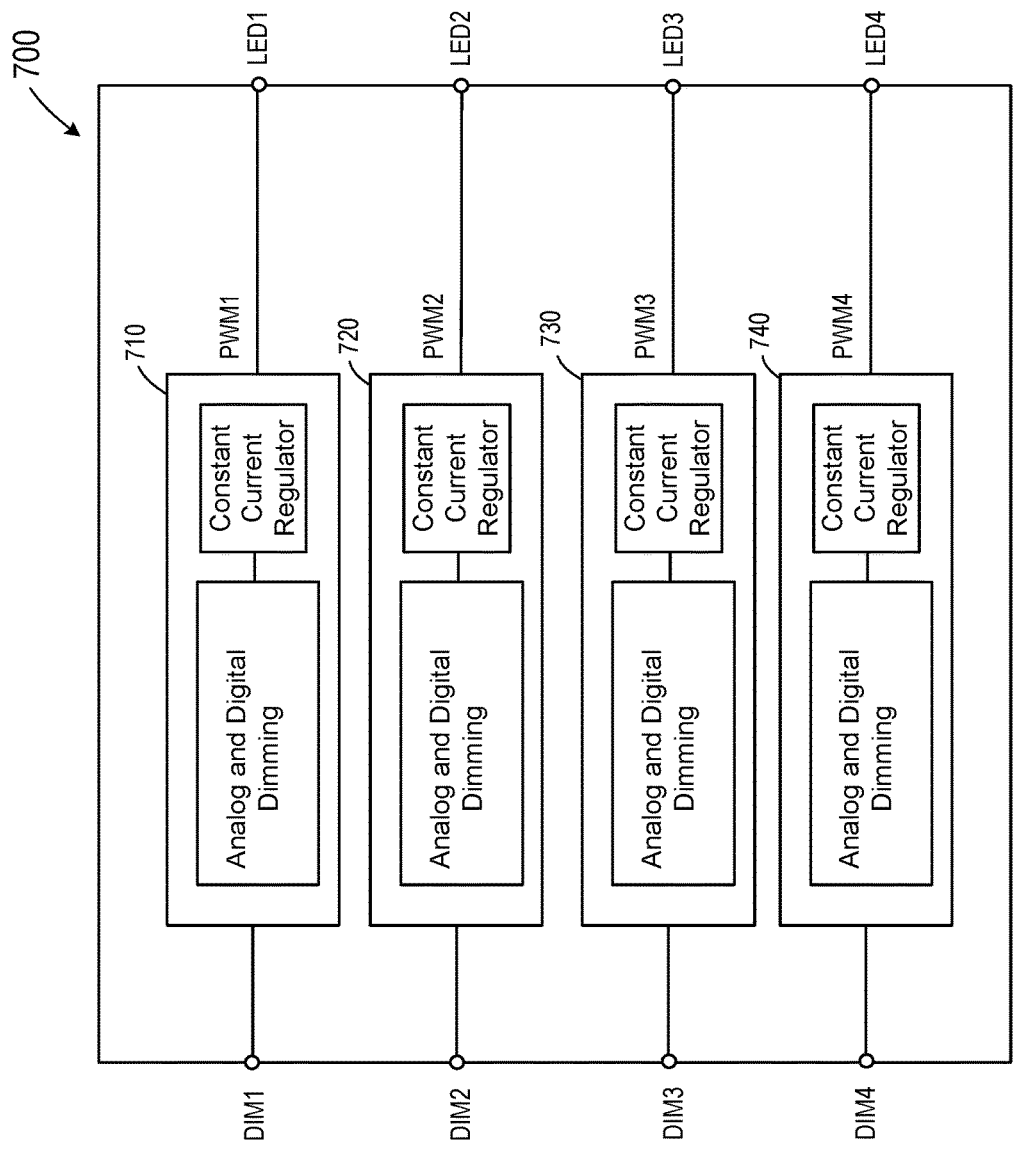
FIG. 7 is a simplified schematic diagram depicting a multiple channel linear regulator that embodies certain aspects of this invention.

FIG. 7 is a simplified schematic diagram depicting a multiple channel linear regulator that embodies certain aspects of this invention. As shown in FIG. 7, linear regulator 700 includes four channels, 710, 720, 730, and 740, and maybe used as regulator 120 in the LED driving system in FIG. 1. The channels regulate a current flow to the output terminals LED1, . . . , LED4, respectively, coupled to the LED strings of the LED lamp. The channels also have input terminals, DIM1, . . . , DIM4, respectively, for receiving dimming input signals. Each channel includes an analog and digital dimming circuit that is similar to the dimming control circuit 210 in FIG. 2. Each channel also has a constant current regulator that is similar to the constant current regulator 220 in FIG. 2. In this example, each channel has a separate dimming control. However, a single dimming control circuit maybe used to control more than one channel or all the channels.

In the examples described above, a constant current regulator is combined with a control circuit that receives either an analog dimming signal or a digital PWM dimming signal at the same input pin to form a linear regulator for controlling the dimming of one or more LED strings. The linear regulator provides the advantage of fast operation and is able to respond to narrow PWM control pulses. However, the invention is not limited to the specific examples described above. The control circuit described above maybe used with other types of power supplies. For example, the control circuit may also be used with a switched mode power supply (SMPS) in fly-back, buck, or boost configurations. An example is described below with reference to FIG. 8.

Figure 8:
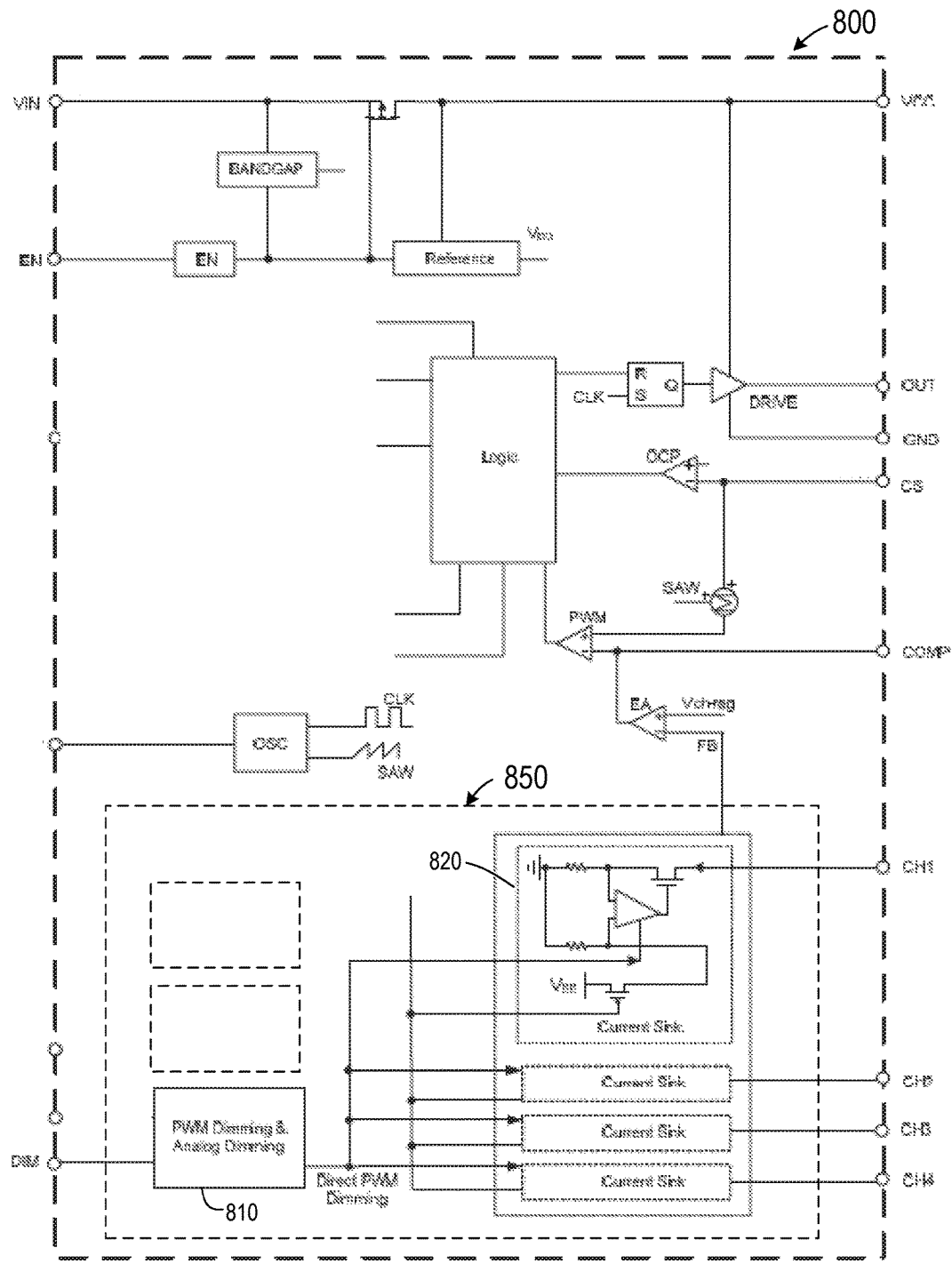
FIG. 8 is a simplified schematic diagram depicting a controller for a switch mode power supply (SMPS) that embodies certain aspects of this invention.

FIG. 8 is a simplified schematic diagram depicting a controller for a switch mode power supply (SMPS) that includes one or more dimming control pins for accepting either an analog or a digital control signal at the same pin. As shown in FIG. 8, controller 800 includes a dimming control circuit 850 that has one or more dimming control pins DIM that receives either an analog or a digital dimming control signal, and controls current flow to the LED strings connected to output pins CH1, CH2, CH3, and CH4. PWM Dimming & Analog Dimming block 810 is similar to dimming control circuit 210 in FIG. 2, and current sink 820 is similar to constant current regulator 220 in FIG. 2. Further, even though only one PWM Dimming & Analog Dimming block 810 is shown, there may be multiple such circuit blocks to allow each channel independent dimming control.

As shown in FIG. 8, SMPS controller 800 may include conventional PWM control functional blocks, such as a logic block labeled Logic, a PWM comparator PWM, an error amplifier EA, an over-current protection comparator OCP, an RS flip-flop, etc. Controller 800 also has an oscillator OSC providing a clock signal CLK and a sawtooth signal SAW. As described above, the invention may also be implemented with a switched mode power supply (SMPS) in various configurations, such as fly-back, buck, or boost configurations. Controller 800 includes a drive amplifier DRIVE providing a control signal OUT to control a power switch to regulate a current flow in an inductor as part of a transformer in a fly-back configuration, or an inductor in a buck or boost configuration. Controller 800 may also include[s] circuit blocks BANDGAP, EN, and Reference for providing reference voltages. Controller 800 may also include[s] standard pins in a conventional controller, such as VIN, EN, VCC, GND, CS, and COMP, etc.

What is claimed is:
1. A dimming control circuit, comprising:
an input terminal for receiving an input signal;
a mode detection circuit coupled to the input terminal for receiving the input signal and configured for determining whether the input signal is a digital signal or an analog signal and for providing a mode signal indicating whether the input signal is a digital signal or an analog signal;
a multiplexer circuit configured for selecting a digital reference signal or an analog reference signal according to the mode signal, the multiplexer circuit having a selection terminal coupled to an output of the mode detection circuit, a first input terminal for receiving the analog reference signal, and a second input terminal for receiving the digital reference signal; and
a comparator circuit configured for comparing the input signal with the selected reference signal and for providing a PWM (pulse width modulation) control signal with a duty cycle according to the comparison.
2. The control circuit of claim 1, wherein the mode detection circuit is configured to:
track the input signal over a preset period of time; and if the input signal crosses a low and high threshold voltages at least twice over the preset period of time, the input signal is determined to be a digital dimming input signal;

otherwise, the input signal is determined to be an analog dimming input signal.

3. The control circuit of claim 2, wherein the preset period of time and the low and high threshold reference voltages are selected based on characteristics of the analog input signal.

4. The control circuit of claim 3, wherein the low threshold voltage is about 0.3 V and the high threshold voltage is about 2.5 V.

5. The control circuit of claim 1, wherein the mode detection circuit comprises two comparators, a timer circuit, a counter, and a logic circuit.

6. The control circuit of claim 1, wherein the mode detection circuit comprises a state machine.

7. The control circuit of claim 1, wherein the analog reference signal is characterized by a sawtooth wave waveform.

8. The control circuit of claim 1, wherein the digital reference signal is a constant voltage signal.

9. The control circuit of claim 1, further comprising a constant-current regulator for receiving the PWM control signal to control a current flow in an LED, the constant-current regulator including:
an input terminal receiving the PWM control signal;
a constant current source coupled in series with a first NMOS transistor and a first resistor;
an output terminal coupled in series with a second NMOS transistor and a second resistor; and
an amplifier having:
a first input coupled to a first node between the first NMOS transistor and the first resistor;
a second input coupled to a second node between the second NMOS transistor and the second resistor;
an output coupled to a gate of the first NMOS transistor and a gate of the second MOS transistor; and
an enable node coupled to the PWM control signal.

10. A control circuit for controlling a current flow to a light-emitting diode (LED), comprising:
a single input pin configured for receiving an input signal that can be either a digital input signal or an analog input signal; and
a single output pin configured for providing a digital signal in response to either the digital input signal or the analog input signal for controlling the current flow in the LED;
wherein the control circuit further comprises:
a mode detection circuit coupled to the single input pin for receiving the input signal and configured for determining whether the input signal is a digital signal or an analog signal and for providing a mode signal indicating whether the input signal is a digital signal or an analog signal;
a multiplexer circuit configured for selecting either a digital reference signal or an analog reference signal in response to the mode signal, the multiplexer circuit having a selection terminal coupled to the output of the mode detection circuit, a first input terminal for receiving the analog reference signal, and a second input terminal for receiving the digital reference signal; and
a comparator circuit configured for comparing the input signal with the selected reference signal to provide a PWM (pulse width modulation) control signal with a duty cycle related to a desired output.

11. The control circuit of claim 10, wherein the analog reference signal is characterized by a sawtooth wave waveform.

12. The control circuit of claim 10, wherein the digital reference signal is a constant voltage signal.

13. A linear regulator for driving a plurality of LED (light emitting diode) strings, the linear regulator comprising:
a power terminal for receiving a DC power supply, said DC power supply also configured to provide power for the LED strings;
a plurality of channels, each channel including:
an input terminal for receiving an input signal, which is either a digital dimming signal or an analog dimming signal;
a mode detection circuit coupled to the input terminal for receiving the input signal and configured for determining whether the input signal is a digital signal or an analog signal and providing a mode signal indicating whether the input signal is a digital signal or an analog signal;
a multiplexer circuit configured for selecting either a digital reference signal or an analog reference signal in response to the mode signal, the multiplexer circuit having a selection terminal coupled to an output of the mode detection circuit, a first input terminal for receiving the analog reference signal, and a second input terminal for receiving the digital reference signal; and
a comparator circuit configured for comparing the input signal with the selected reference signal to provide a PWM (pulse width modulation) control signal with a duty cycle related to a desired output; and
a constant-current regulator configured for receiving the PWM control signal to control a current flow in the LED string.

14. The linear regulator of claim 13, wherein the input signal is a dimming signal.

15. The linear regulator of claim 13, wherein the mode detection circuit is configured to:
track the input signal over a preset period of time; and
if the input signal crosses a low and high threshold voltages at least twice over the preset period of time, the input signal is determined to be a digital dimming input signal;
otherwise, the input signal is determined to be an analog dimming input signal.

16. The linear regulator of claim 15, wherein the preset period of time and the low and high threshold reference voltages are selected based on characteristics of the analog input signal.

17. The linear regulator of claim 13, wherein the analog reference signal is characterized by a sawtooth wave waveform, and the digital reference signal is a constant voltage signal.

18. The linear regulator of claim 13, wherein the constant current regulator comprises:
an input terminal for receiving the PWM control signal;
a constant current source coupled in series with a first NMOS transistor and a first resistor;
an output terminal coupled in series with a second NMOS transistor and a second resistor; and
an amplifier having:
a first input coupled to a first node between the first NMOS transistor and the first resistor;
a second input coupled to a second node between the second NMOS transistor and the second resistor;

an output coupled to a gate of the first NMOS transistor and a gate of the second transistor; and an enable node coupled to the PWM control signal to enable or disable the amplifier in response to the PWM control signal.

19. The linear regulator of claim 18, wherein, if the amplifier is enabled by the PWM signal, a voltage at the first node is equal to a voltage at the second node, and a current flowing in the second NMOS transistor is proportional to a current of the constant current source by factor n, where n is a ratio of the resistance of the first resistor to the resistance of the second resistor.

* * * * *